United States Patent
Sollami et al.

(10) Patent No.: US 11,727,463 B2
(45) Date of Patent: Aug. 15, 2023

(54) SYSTEMS AND METHODS OF IMAGE-BASED NEURAL NETWORK APPAREL RECOMMENDATION

(71) Applicant: salesforce.com, inc., San Francisco, CA (US)

(72) Inventors: Michael Sollami, Cambridge, MA (US); Yang Zhang, Cambridge, MA (US)

(73) Assignee: Salesforce, Inc., San Francisco, CA (US)

( * ) Notice: Subject to any disclaimer, the term of this patent is extended or adjusted under 35 U.S.C. 154(b) by 456 days.

(21) Appl. No.: 16/594,257

(22) Filed: Oct. 7, 2019

(65) Prior Publication Data
US 2021/0103970 A1   Apr. 8, 2021

(51) Int. Cl.
G06Q 30/00 (2023.01)
G06Q 30/0601 (2023.01)
G06T 7/11 (2017.01)
G06T 7/70 (2017.01)

(52) U.S. Cl.
CPC ..... *G06Q 30/0631* (2013.01); *G06Q 30/0643* (2013.01); *G06T 7/11* (2017.01); *G06T 7/70* (2017.01)

(58) Field of Classification Search
CPC .................. G06Q 30/0631; G06Q 30/0643
USPC ........................................................ 705/26.7
See application file for complete search history.

(56) References Cited

U.S. PATENT DOCUMENTS

| | | | | |
|---|---|---|---|---|
| 10,902,051 | B2 * | 1/2021 | Hu | G06F 16/532 |
| 10,963,939 | B1 * | 3/2021 | Zehr | G06K 9/6256 |
| 11,026,461 | B2 * | 6/2021 | Schultz | G06Q 10/06315 |
| 11,037,222 | B1 * | 6/2021 | Natesh | G06Q 30/0631 |
| 2016/0203525 | A1 * | 7/2016 | Hara | G06K 9/6277 705/14.56 |
| 2017/0278135 | A1 * | 9/2017 | Majumdar | G06V 10/82 |
| 2018/0032818 | A1 * | 2/2018 | Abraham | G06Q 30/0643 |
| 2019/0066140 | A1 * | 2/2019 | Mani | G06Q 50/188 |
| 2019/0132715 | A1 * | 5/2019 | Marzouk | G06F 3/0631 |
| 2019/0244407 | A1 * | 8/2019 | Wiesel | G06K 9/00369 |
| 2020/0143454 | A1 * | 5/2020 | Ananthanarayana | G06Q 30/0643 |

(Continued)

OTHER PUBLICATIONS

Han, X. (2018). Deep learning for fashion and forensics (Order No. 10842589). Available from ProQuest Dissertations & Theses Global. (2118074055). Retrieved from https://www.proquest.com/dissertations-theses/deep-learning-fashion-forensics/docview/2118074055/se-2 (Year: 2018).*

*Primary Examiner* — Arielle E Weiner
(74) *Attorney, Agent, or Firm* — Butzel Long

(57) ABSTRACT

Systems and methods are provided for receiving an image that includes a clothed person, determining a pose of the person in the image, and segmenting the image into one or more first fashion items. One or more second fashion items may be determined using a similarity search that searches at least one storage device communicatively coupled to the server based on the one or more first fashion items. At least one outfit proposal may be generated based on the one or more second fashion items. Image re-stylization of corresponding portions of the image may be performed, including the clothed person to generate recommended outfit images based on the at least one outfit proposal. The generated outfit images may be transmitted for display.

12 Claims, 5 Drawing Sheets

(56) References Cited

U.S. PATENT DOCUMENTS

2020/0375293 A1* 12/2020 Koh ................... G06Q 30/0641

* cited by examiner

SYSTEMS AND METHODS OF IMAGE-BASED NEURAL NETWORK APPAREL RECOMMENDATION

BACKGROUND

Present "style transfer" systems can transfer the style of one image onto another image. These systems use a reference style image, and an image for the style to be transferred to. For example, an image of a van Gogh painting can be used as a reference style image, and the style can be applied to another image provided by a user. In another example, a user can provide an amateur headshot image, and a style transfer system can apply the style of a particular professional headshot image to the amateur headshot image.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1:
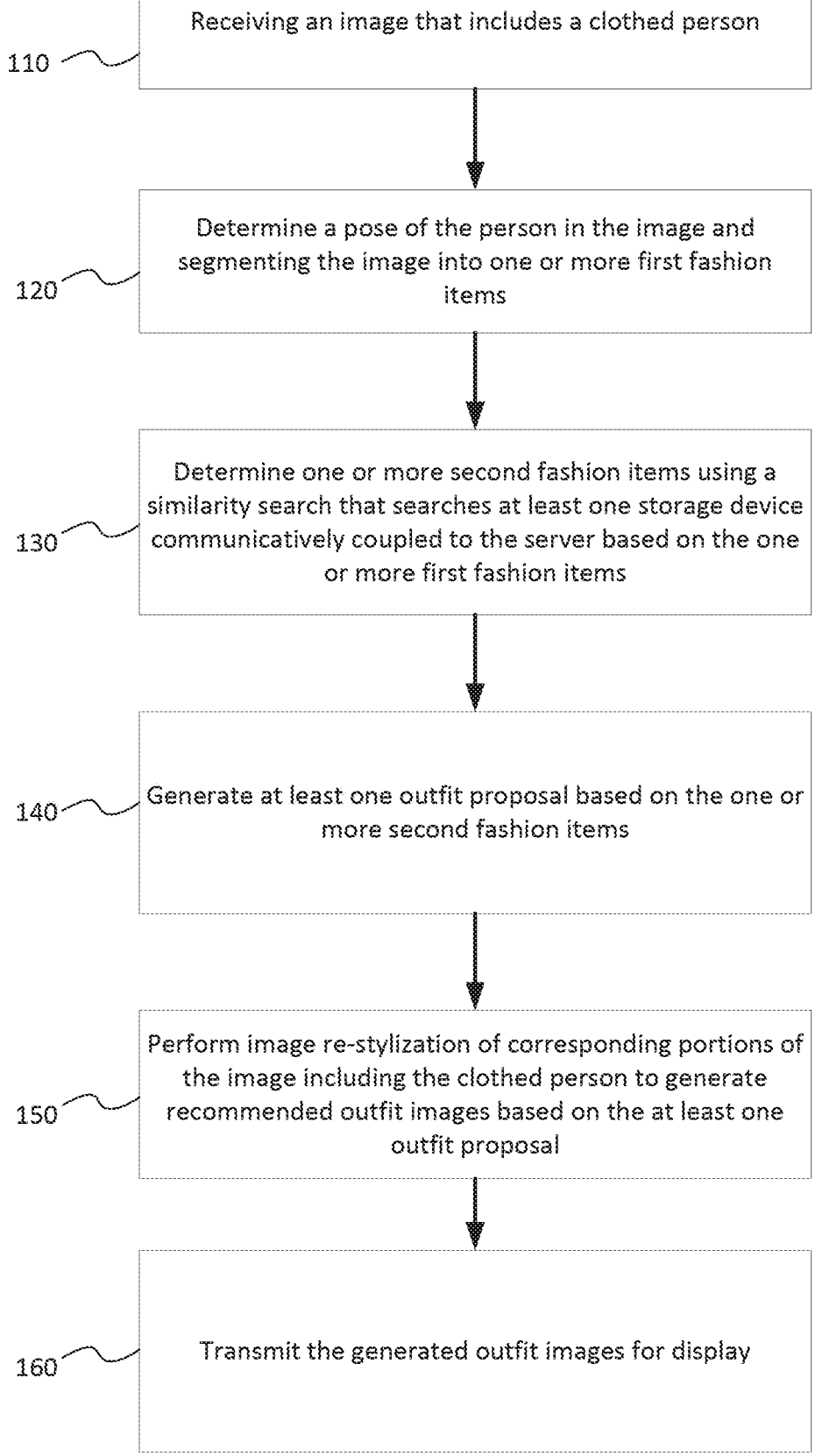
FIG. 1 shows an example method of generating recommendations showing outfit alternatives, and stylizing an image of a person to show the generated outfit alternatives on the person, based on a received imaged that includes the person with clothing and/or fashion items according to an implementation of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide systems and methods of generating recommendations showing outfit alternatives, and stylizing an image of a person to show the generated outfit alternatives on the person, based on a received imaged that includes a person with clothing and/or fashion items. Implementations of the disclosed subject matter provide fashion item parsing (e.g., the parsing of apparel and accessories in an image) and similarity searches in one or more databases of preferences (e.g., how often each product was accessed) to generate possible outfit variations.

Implementations of the disclosed subject matter may determine a person's pose in an image, and segment the image into individual fashion items (e.g., shirt, shoes, handbag, belt, jewelry, and the like). A search may be performed for similar style outfits using a similarity search. The search components may be weighted based on which items have been viewed, clicked, purchased, or the like in the past. For each of a predetermined number of outfits proposed, an image re-stylization may be applied at the pixel level of the corresponding pieces of an input image (i.e., the original image) including the person, producing images that include outfit recommendations. The user may select, customize, and/or purchase one or more of the recommended outfits.

Implementations of the disclosed subject matter improve upon traditional style transfer from one image to another by presenting fashion items and/or coordinated outfits that may be of interest to a user based on an input image and/or the user's tastes and/or preferences, and by generating photo-realistic images of the user in the same pose as the input image with the recommended outfits.

Figure 2:
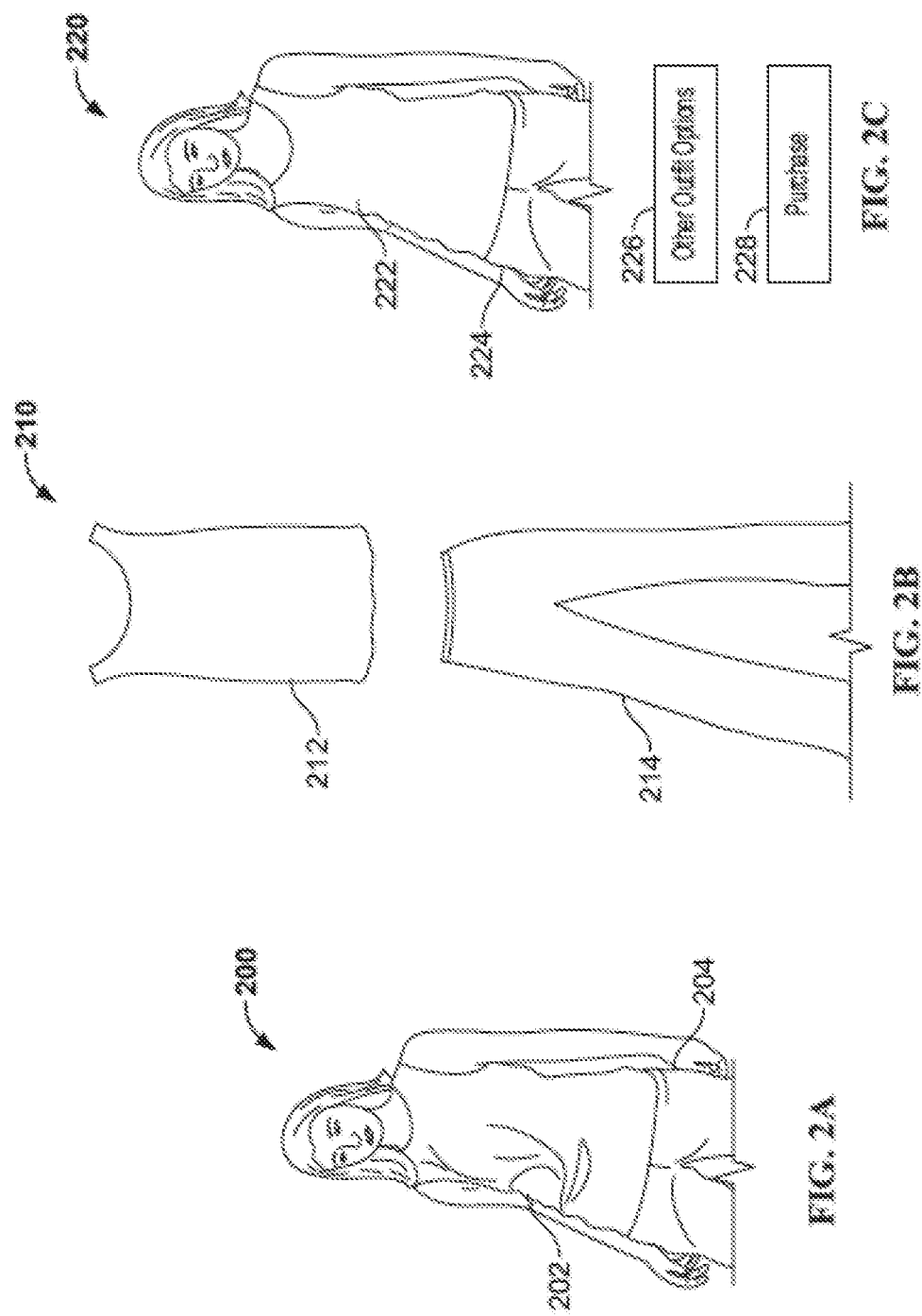
FIG. 2A shows an example image of a clothed person to generate outfit recommendations for according to an embodiment of the disclosed subject matter.
FIG. 2B shows an example of a clothing item that may be part of a recommended outfit according to an implementation of the disclosed subject matter.
FIG. 2C shows an image of a person with the recommended outfit of FIG. 2B according to an implementation of the disclosed subject matter.

FIG. 1 shows an example method 100 of determining similar fashion items and re-styling an image based on determined fashion items recommendations, based on a received imaged that includes a person with clothing and/or fashion items according to an implementation of the disclosed subject matter. A server (e.g., central component 600 and/or second computer 700 shown in FIG. 4, and/or databases system databases 1200a-1200d shown in FIG. 5) may receive an image that includes a clothed person and/or a person wearing fashion items at operation 110. The clothes and/or fashion items may include, for example, a dress, skirt, blouse, shirt, pants, jacket, suit, tie, hat, scarf, belt, shoes, bag, jewelry, or the like. For example, FIG. 2A shows image 200 which includes an example image of a clothed person, which may be used by method 100 to generate outfit recommendations.

The server may determine a pose of the person in the image, and may segment the image into one or more first fashion items at operation 120. The first fashion items may be, for example, a shirt, pants, skirt, dress, sweater, jacket, hat, socks, shoes, belt, tie, scarf, purse, bag, jewelry, or the like. For example, the outfit of the person in the image 200 of FIG. 2A may be segmented to identify shirt 202 and pants 204.

The segmentation at operation 120 may include, for example, determine a semantic segmentation of the pixels of the person shown the image 200, and determine keypoints of the person's body. Example systems and methods of performing the semantic segmentation and determining the keypoints disclosed in U.S. patent application Ser. No. 16/658,206 (now, U.S. Pat. No. 11,250,572), entitled "Systems and Methods of Generating Photorealistic Garment Transferrance in Images", which is incorporated by reference herein in its entirety.

The server may determine one or more second fashion items using a similarity search at operation 130. The second fashion items may be may be, for example, a shirt, pants, sweater, blouse, dress, skirt, jacket, hat, socks, shoes, belt, tie, scarf, purse, bag, jewelry, or the like that are similar to the corresponding first fashion items based on style, color, pattern, or the like. The server may search at least one storage device (e.g., storage 710 shown in FIG. 4 and/or databases system databases 1200*a*-1200*d* shown in FIG. 5) communicatively coupled to the server based on the one or more first fashion items. For example, the server may search the at least one storage device, which may include a catalog, for fashion items that may be similar to the shirt 202 and/or the pants 204 shown in FIG. 2A. The similarity may be based on color, style, size, fabric, fashion item type (e.g., pants, shirt, socks, shoes, belt, hat, gloves, scarf, hat, shorts, skirt, dress, suit, jacket, jewelry, or the like), material, pattern, or the like. In some implementations, the search may locate items in the catalog that are stylistically similar to the shirt 202 and/or pants 204, and/or may find items that other users have purchased that appear similar to the shirt 202 and/or the pants 204.

The similarity search may include weighting components of the one or more first fashion items by a predetermined amount. In some implementations, the components may be weighted based on an amount at which the one or more fashion items have been viewed, the amount at which the one or more fashion items have been selected, and/or the amount at which the one or more fashion items have been purchased.

At operation 140, the server may generate at least one outfit proposal based on the one or more second fashion items. For example, image 210 of FIG. 2B may have at least a portion of an outfit proposal generated by the server that includes shirt 212 and/or pants 214. The outfit shown in image 210 may include fashion items that may be paired together in a style that may be similar to that of the fashion items shown in the initial image that includes the clothed person. That is, the shirt 212 and/or the pants 214 of the outfit proposal in image 210 may be stylistically similar to the shirt 204 and/or the pants 204 shown in image 200.

In some implementations, the generated at least one outfit proposal may be based on at least one of a style profile of a user, and/or a database of items that are complementary to one another. The style profile of the user may include at least one of the one or more fashion items that have been viewed by the user, the one or more fashion items that have been selected by the user, and/or the one or more fashion items have been purchased by the user. The items of the at least one outfit proposal may be equivalent items to the one or more first fashion items, and/or complementary items to the one or more first fashion items.

The server may perform a re-stylization of corresponding portions of the image of the clothed person at operation 150. The server may generate recommended outfit images based on at least one outfit proposal, such as the outfit proposal shown in image 210 of FIG. 2B. The re-stylization may include generating one or more images of the person in the recommended outfit images. In some implementations, the re-stylization may be performed using the systems and methods disclosed in U.S. patent application Ser. No. 16/658,206 (now, U.S. Pat. No. 11,250,572), entitled "Systems and Methods of Generating Photorealistic Garment Transferrance in Images", which is incorporated by reference herein in its entirety. For example, the server may use a masked version of the received image, at least one semantic segmentation image, and one or more fashion item images to generating an image that includes the person with the fashion items of the recommended outfit.

At operation 160, the server may transmit the outfit images for display. The images may be transmitted via a communications network between the server and a computer (e.g., to computer 500 shown in FIG. 4) of a user to be displayed (e.g., on user display 520 shown in FIG. 4). The images generated in operation 150 and transmitted at operation 160 may be shown, for example, in display 220 shown in FIG. 2C. Image 220 of FIG. 2C may show the person of image 200 re-stylized with the outfit that includes shirt 212 and/or pants 214 of image 210 shown in FIG. 2B. That is, the shirt 212 and/or pants 214 may be re-stylized as shirt 222 and/or pants 224 to create a photorealistic image of the apparel items fitted to the person.

In some implementations, the server may receive a selection, such as for other outfit options 226 shown in FIG. 2B, for one or more the recommended outfit images (e.g., the shirt 222 and/or pants 224) to customize the recommended outfit images. For example, the color, pattern, size, or the like may be changed based on input from the user (e.g., received via user input 560 of computer 500 shown in FIG. 4).

The server may receive selection 228 (e.g., via user input 560 of computer 500 shown in FIG. 4) to purchase an outfit displayed in the one or more recommended outfit images. For example, the shirt 222 and/or pants 224 may be purchased, or the customized shirt 222 and/or pants 224 (e.g., customized for color, pattern, size, or the like) may be purchased.

Figure 3:
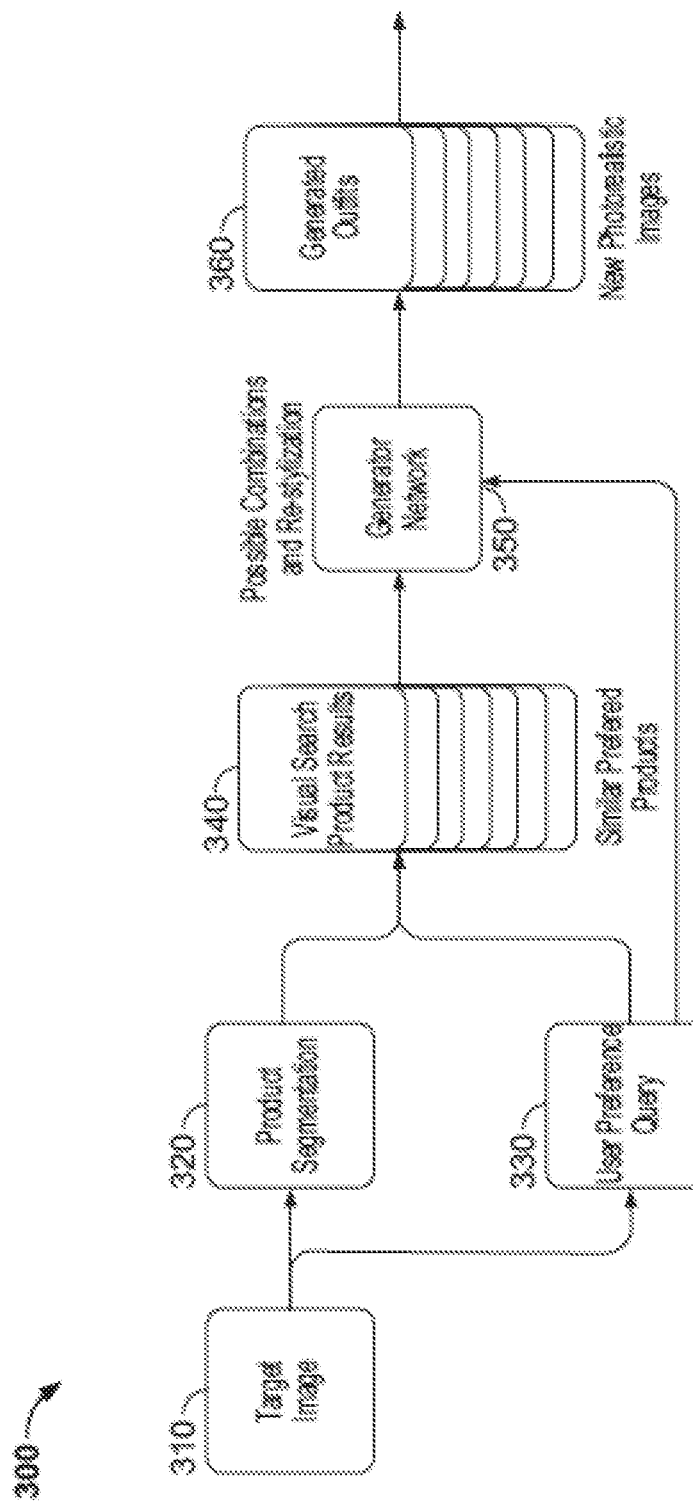
FIG. 3 shows an example generative adversarial network (GAN) to generate outfit options and generate photo-realistic images of the person wearing the generated outfits according to an implementation of the disclosed subject matter.

FIG. 3 shows an example generative adversarial network (GAN) 300 to generate outfit options and generate photorealistic images of the person wearing the outfit options according to an implementation of the disclosed subject matter. The GAN 300 may be implemented on a server (e.g., central component 600 and/or second computer 700 shown in FIG. 4, and/or databases system databases 1200*a*-1200*d* shown in FIG. 5) and/or a computer (e.g., computer 500 shown in FIG. 4). The GAN 300 may receive a target image 310, for example, as part of operation 110 shown in FIG. 1 and described above. For example, the target image 310 may be received from computer 500 shown in FIG. 4. At 320, the GAN may segment fashion items from the received target image 310 so as to identify the fashion items being worn by the person in the target image 310. The segmentation performed by the GAN at 320 may be at least part of operation 120 shown in FIG. 1 and described above.

GAN 300 may receive a user preference query 330, which may include information regarding styles, sizes, colors, patterns, fabric type, fashion items, accessories, or the like that may be used to generate outfit options. The preference query 330 may be received, for example, from user input 560 of computer 500 shown in FIG. 4. The segmentation information and the user preference query information may be combined and/or used to identify product results at 340, such as by performing the similarity search 130 shown in FIG. 1 and described above. The identified product results 340 may be similar preferred products by the user and/or others with style preferences that are similar to the user.

Generator network 350 of GAN 300 may determine the possible combinations of fashion items identified from the product results 340. The generator network 350 may generate the outfit proposals by, for example, using operation 140 shown in FIG. 1 and described above. The generator network 350 may generate images of the person in the target image 310 with the determined combinations, by, for example using the operation 150 described above to re-style the image. Photorealistic images of the determined combination of outfits may be generated and displayed at 360.

Figure 4:
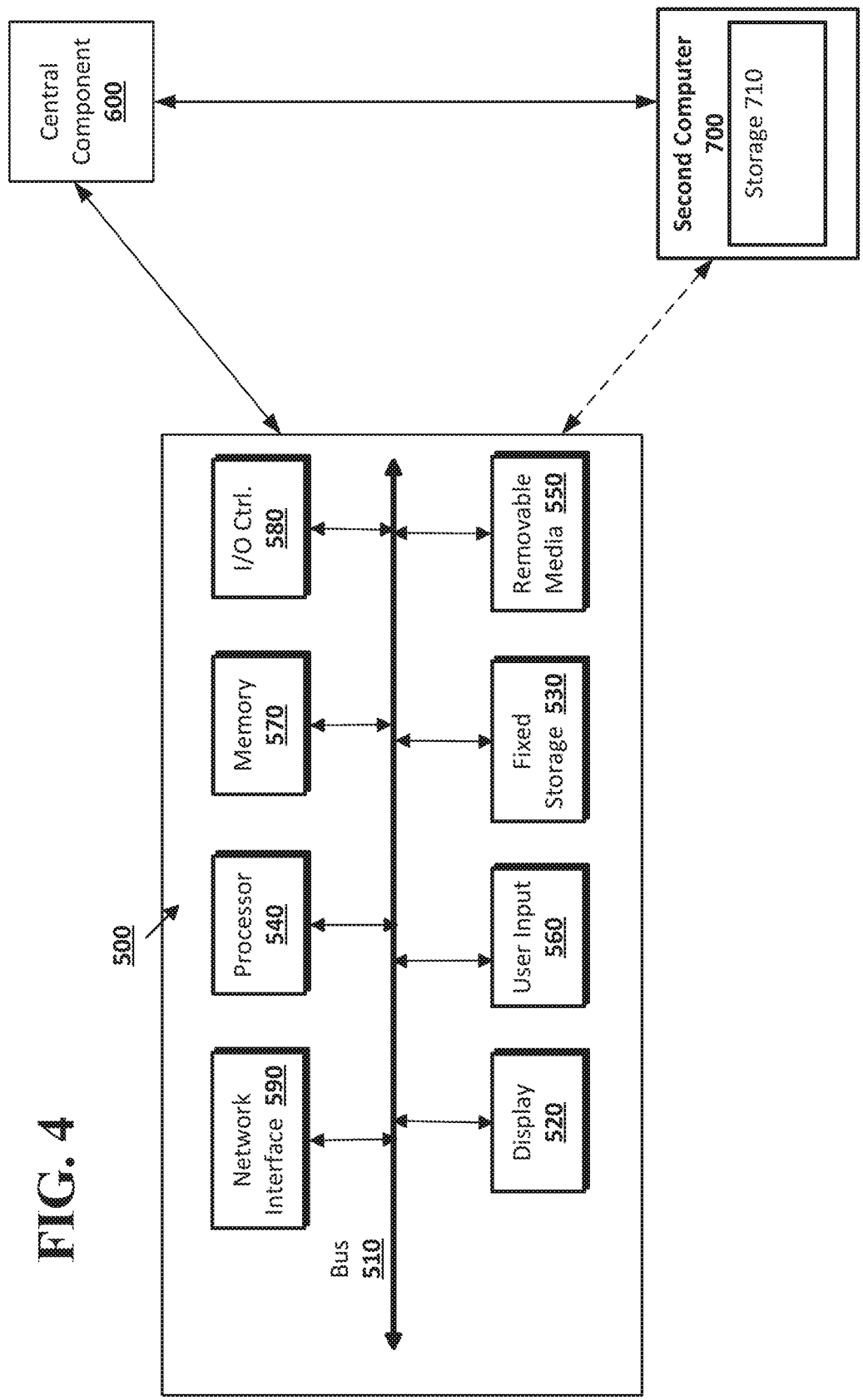
FIG. 4 shows a computer system according to an implementation of the disclosed subject matter.

Implementations of the presently disclosed subject matter may be implemented in and used with a variety of component and network architectures. FIG. 4 is an example computer 500 suitable for implementing implementations of the presently disclosed subject matter. As discussed in further detail herein, the computer 500 may be a single computer in a network of multiple computers. In some implementations, the computer 500 may be used to provide the initial image of the clothed person, outfit recommendations (e.g., image 200 shown in FIG. 2A), and/or photorealistic images of the person with the recommended outfits on the display 520. As shown in FIG. 4, the computer 500 may communicate with a central or distributed component 600 (e.g., server, cloud server, database, cluster, application server, neural network system, or the like). The central component 600 may communicate with one or more other computers such as the second computer 700, which may include a storage device 710. The second computer 700 may be a server, cloud server, neural network system, or the like. The storage 710 may use any suitable combination of any suitable volatile and non-volatile physical storage mediums, including, for example, hard disk drives, solid state drives, optical media, flash memory, tape drives, registers, and random access memory, or the like, or any combination thereof.

Figure 5:
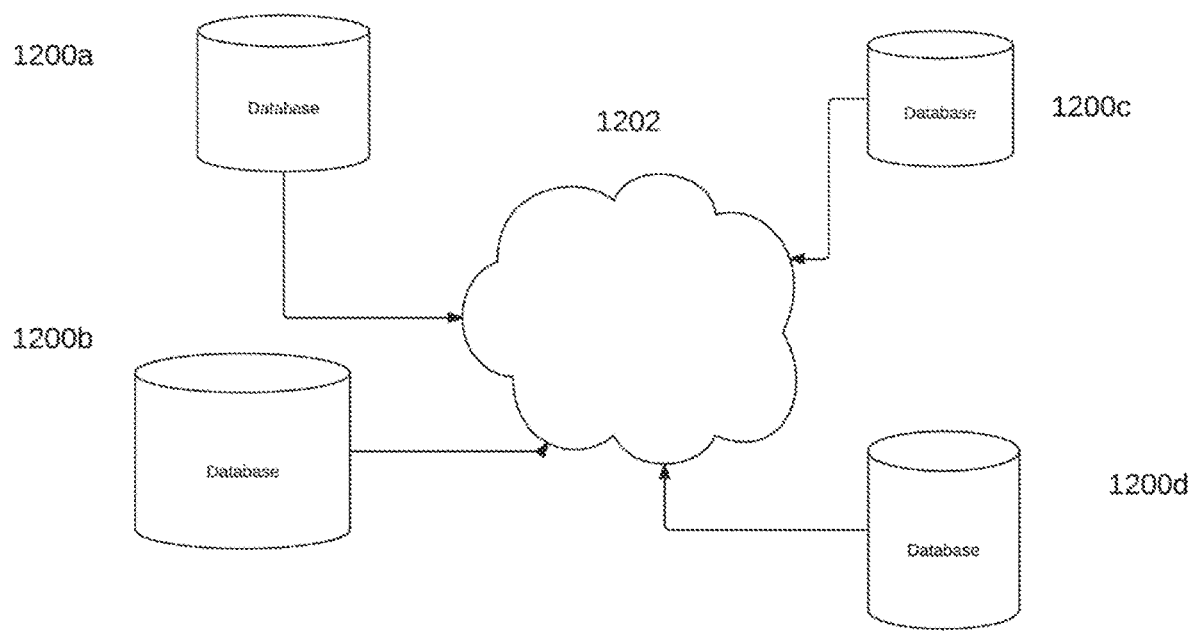
FIG. 5 shows a network configuration according to an implementation of the disclosed subject matter.

The storage 710 of the second computer 700 can store data (e.g., one or more image of an electronic catalog with fashion items, user style preference information, user viewing history of fashion item, user purchase history of fashion items, or the like). Further, if the systems shown in FIGS. 4-5 are multitenant systems, the storage can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The information obtained to and/or from a central component 600 can be isolated for each computer such that computer 500 cannot share information with central component 600 (e.g., for security and/or testing purposes). Alternatively, or in addition, computer 500 can communicate directly with the second computer 700.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, as shown in FIGS. 4-5.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIGS. 4-5 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

FIG. 5 shows an example network arrangement according to an implementation of the disclosed subject matter. Four separate database systems 1200a-d at different nodes in the network represented by cloud 1202 communicate with each other through networking links 1204 and with users (not shown). The database systems 1200a-d may store, for example, one or more electronic catalogs of fashion items that may be used to make outfit recommendations, user style preferences, user purchase history, user viewing history of the fashion items, or the like. In some implementations, the one or more of the database systems 1200a-d may be located in different geographic locations. Each of database systems 1200 can be operable to host multiple instances of a database, where each instance is accessible only to users associated with a particular tenant. Each of the database systems can constitute a cluster of computers along with a storage area network (not shown), load balancers and backup servers along with firewalls, other security systems, and authentication systems. Some of the instances at any of database systems 1200a-d may be live or production instances processing and committing transactions received from users and/or developers, and/or from computing elements (not shown) for receiving and providing data for storage in the instances.

One or more of the database systems 1200a-d may include at least one storage device, such as in FIG. 5. For example, the storage can include memory 570, fixed storage 530, removable media 550, and/or a storage device included with the central component 600 and/or the second computer 700. The tenant can have tenant data stored in an immutable storage of the at least one storage device associated with a tenant identifier.

In some implementations, the one or more servers shown in FIGS. 4-5 can store the data (e.g., images of products of the electronic catalog and the like) in the immutable storage of the at least one storage device (e.g., a storage device associated with central component 600, the second computer 700, and/or the database systems 1200a-1200d) using a log-structured merge tree data structure.

The systems and methods of the disclosed subject matter can be for single tenancy and/or multitenancy systems. Multitenancy systems can allow various tenants, which can be, for example, developers, users, groups of users, and/or organizations, to access their own records (e.g., tenant data and the like) on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multi-tenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, a log structured merge (LSM) tree.

Further, a multitenant system can have various tenant instances on server systems distributed throughout a network with a computing system at each node. The live or production database instance of each tenant may have its transactions processed at one computer system. The computing system for processing the transactions of that instance may also process transactions of other instances for other tenants.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "generating," "performing," "transmitting," "weighting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
receiving, at a server, an image that includes a clothed person;
determining, at the server, a pose of the person in the image and segmenting the image into one or more first fashion items;
determining, at the server, one or more second fashion items using a similarity search that searches at least one storage device communicatively coupled to the server based on the one or more first fashion items, wherein the similarity search comprises weighting components of the one or more first fashion items by an amount at which the one or more first fashion items have been purchased by other users;

generating, at the server, at least one outfit proposal based on the one or more second fashion items and by using a database of items that are complimentary to the first fashion items, wherein an instance of the database is associated with a particular tenant;

performing, at the server, image re-stylization of corresponding portions of the image including the clothed person by:

generating, at the server, recommended outfit images based on the at least one outfit proposal, where the generated recommended outfit images include the person wearing the at least one outfit proposal, and wherein the server implements a trained generative adversarial network (GAN);

transmitting, via a communications network coupled to the server, the recommended outfit images for display; and receiving a selection, at the server, to customize at least one selected from the group consisting of: a color, pattern, and size of the recommended outfit images.

2. The method of claim 1, wherein the weighting components further comprises:

weighting the components based on at least one selected from the group consisting of: an amount at which the one or more fashion items have been viewed, and the amount at which the one or more fashion items have been selected.

3. The method of claim 1, wherein the generated at least one outfit proposal is based on a style profile of a user.

4. The method of claim 3, wherein the style profile of the user includes at least one from the group consisting of: the one or more fashion items that have been viewed by the user, the one or more fashion items that have been selected by the user, and the one or more fashion items have been purchased by the user.

5. The method of claim 1, wherein items of the at least one outfit proposal are selected from the group consisting of: equivalent items to the one or more first fashion items, and complementary items to the one or more first fashion items.

6. The method of claim 1, further comprising:

receiving a selection, at the server, to purchase an outfit displayed in the one or more recommended outfit images.

7. A system comprising:

at least one storage device; and a server configured to implement a trained generative adversarial network (GAN), communicatively coupled to the at least one storage device to receive an image that includes a clothed person, to determine a pose of the person in the image and segmenting the image into one or more first fashion items, to determine one or more second fashion items using a similarity search that searches the at least one storage device communicatively coupled to the server based on the one or more first fashion items where the similarity search comprises weighting components of the one or more first fashion items by an amount at which the one or more first fashion items have been purchased by other users, to generate at least one outfit proposal based on the one or more second fashion items by using a database of items that are complimentary to the first fashion items, wherein an instance of the database is associated with a particular tenant, to perform image re-stylization of corresponding portions of the image including the clothed person by generating recommended outfit images with the GAN based on the at least one outfit proposal, where the generated recommended outfit images include the person wearing the at least one outfit proposal, to transmit, via a communications network coupled to the server, the recommended outfit images for display, and receive a selection to customize at least one selected from the group consisting of: a color, pattern, and size of the recommended outfit images.

8. The system of claim 7, wherein the server weights the components further based on at least one selected from the group consisting of: an amount at which the one or more fashion items have been viewed, and the amount at which the one or more fashion items have been selected.

9. The system of claim 7, wherein the generated at least one outfit proposal is based on a style profile of a user.

10. The system of claim 9, wherein the style profile of the user includes at least one from the group consisting of: the one or more fashion items that have been viewed by the user, the one or more fashion items that have been selected by the user, and the one or more fashion items have been purchased by the user.

11. The system of claim 7, wherein items of the at least one outfit proposal are selected from the group consisting of: equivalent items to the one or more first fashion items, and complementary items to the one or more first fashion items.

12. The system of claim 7, wherein the server receives a selection to purchase an outfit displayed in the one or more recommended outfit images.

* * * * *